US006762912B2

(12) United States Patent
Ma

(10) Patent No.: US 6,762,912 B2
(45) Date of Patent: Jul. 13, 2004

(54) HEAD CLEANER FOR A DISK DRIVE INTO WHICH A DISK MEDIA CARTRIDGE IS INSERTED

(75) Inventor: Yiping Ma, Layton, UT (US)

(73) Assignee: Iomega Corporation, San Diego, CA (US)

(*) Notice: Subject to any disclaimer, the term of this patent is extended or adjusted under 35 U.S.C. 154(b) by 368 days.

(21) Appl. No.: 09/829,452

(22) Filed: Apr. 10, 2001

(65) Prior Publication Data

US 2002/0145825 A1 Oct. 10, 2002

(51) Int. Cl.[7] ................................................. G11B 5/54
(52) U.S. Cl. ................. 360/128; 360/254.1; 360/255.6; 360/255.7
(58) Field of Search ............................. 360/128, 254.1, 360/255.6, 255.3, 255.7, 254.7, 254.8

(56) References Cited

U.S. PATENT DOCUMENTS

| 4,763,216 A | * | 8/1988 | Solhjell et al. | 360/128 |
|---|---|---|---|---|
| 5,012,377 A | * | 4/1991 | Siddio et al. | 360/128 |
| 5,363,267 A | * | 11/1994 | Fang | 360/128 |
| 5,486,970 A | * | 1/1996 | Lee et al. | 360/128 |
| 5,768,059 A | | 6/1998 | Bishop | 360/105 |
| 5,920,445 A | | 7/1999 | Angellotti et al. | 360/106 |
| 5,973,886 A | | 10/1999 | Kuhn | 360/105 |
| 6,069,776 A | * | 5/2000 | Hasegawa et al. | 360/128 |

OTHER PUBLICATIONS

Grill & Meyerson, "Development and Status of Diamond-like Carbon" in K.E. Spear & J.P. Dismukes (eds.), Synthetic Diamond: Emerging CVD Science and Technology, John Wiley & Sons, New York, 1994, chp. 5, p. 91.
Grill, "Tribology of Diamond–Like Carbon and Related Materials: An Updated Review," Surf. Coat. Technol., 1997, 94/95:507–513.
Grill, "Diamond–Like Carbon: State of the Art," Diam. Rel. Mater., 1999, 8:428–434.
Bentzon et al., Metallic Interlayers Between Steel and Diamond–Like Carbon, Surface. Coat. Technol., 1994, 68/69:651–655.
Yoshino et al., "Deposition of A Diamond–Like Carbon Film on A Stainless Steel Substrate: Studies of Intermediate Layers," Surf. Coat. Technol., 1991, 47:84–88.

* cited by examiner

Primary Examiner—Jefferson Evans
(74) Attorney, Agent, or Firm—James T. Hagler

(57) ABSTRACT

A disk drive has a rigid head cleaner with a textured surface. The texture lines are primarily orthogonal to the direction of movement of the read/write heads as they move across the head cleaner. The head cleaner may be coated with a diamond-like carbon protective coating or a lubricant. A soft head cleaning element may be placed next to the rigid head cleaner.

2 Claims, 2 Drawing Sheets

Direction of motion of slider during Load / Unload

HEAD CLEANER FOR A DISK DRIVE INTO WHICH A DISK MEDIA CARTRIDGE IS INSERTED

FIELD OF THE INVENTION

This invention relates to data storage disk drives in which heads read and write data on a storage disk and more particularly to an improved head cleaner which cleans the heads when they are moved out of engagement with the recording medium.

PRIOR ART

Contamination build up on the air bearing surface of recording heads is a common problem in removable disk drives. Cleanness maintenance of the recording head is thus an important part of drive development work. In the JAZ® drive supplied by Iomega Corporation, assignee of the present application, the heads are loaded at low RPM so that there is contact between the head slider and the disk surface. This is intended to keep debris off of the slider surface. However, as the linear recording density increases, the disk surface becomes much more smooth and this reduces the effectiveness of debris removal during low RPM head loading.

A load ramp assembly is used to clean the heads in the ZIP® drives supplied by Iomega Corporation.

U.S. Pat. No. 5,768,059, Bishop et al. shows a disk drive in which the position of the magnetic heads with respect to the disk is carefully controlled during the loading and unloading of the heads. Head loading and unloading is accomplished in an efficient displacement, thus assuring that the heads will not be destroyed during the load/unload process. By reducing the vertical displacement, more heads and more disks can act in the same vertical height, thereby allowing more data storage capacity in the same form factor or volume.

Wings on the heads control the vertical position of the head. The wings are in close proximity to the heads to fully ensure that the motion of the wing is the motion of the heads. The wings ride on opposed profiles as the actuator carriage moves toward and away from the disk. As the heads move toward the disk, first opposed profiles separate the heads so that the heads can pass on both sides of the disk. Further travel of the actuator causes the wings to ride over second opposed profiles which bring the heads together onto the disk in a controlled manner. As the heads are retracted from the disk they are parked and moved across a cleaning pad.

The ORB drives supplied by Castlewood have a load ramp assembly similar to the ZIP drives. U.S. Pat. No. 5,973,886, Kuhn is an example of a Castlewood drive. A brush like material was used in the ORB drive as a head cleaner.

Testing shows that this head cleaner is not very aggressive so that debris smeared on the air bearing surface of the slider is not removed by the head cleaner. The head cleaner is only effective in moving loose debris accumulated on the slider around.

It is an object of the present invention to provide an improved head cleaner for a disk drive.

SUMMARY OF THE INVENTION

In accordance with the present invention a head cleaner for a disk drive includes a rigid material with a textured surface. An actuator in the disk drive moves the heads onto the disk surface for reading/writing information on the disk. When the heads are moving out of engagement with the disk surface they are moved to a parked position in which they come together on the head cleaner of the present invention. The actuator moves the heads a short distance on the head cleaner.

Further in accordance with the invention, the texture lines on the head cleaner are not parallel to the direction of the motion of the slider and they form a crosshatched pattern. The head cleaner cleans the head through light abrasion during the head load/unload process. Because of this it is very effective in removing debris that are smeared onto the head slider surface thus preventing head degradation.

In an alternate embodiment of the invention, the surface of the head cleaner is coated with a protective coating commonly known as DLC (Diamond Like Carbon). The DLC coating can provide better wear resistance of the head cleaner. A thin layer of lubricant can be added on the DLC coating as well.

In yet another alternative embodiment of the invention, the rigid head cleaner is placed next to a soft felt like head cleaner such that the soft head cleaner works to remove debris in secondary surfaces of the slider while the rigid head cleaner cleans the debris from the primary surfaces of the slider body.

The foregoing and further objects features and advantages of the invention will be better understood from the following more detailed description and appended claims.

DESCRIPTION OF THE PREFERRED EMBODIMENTS

Figure 1:
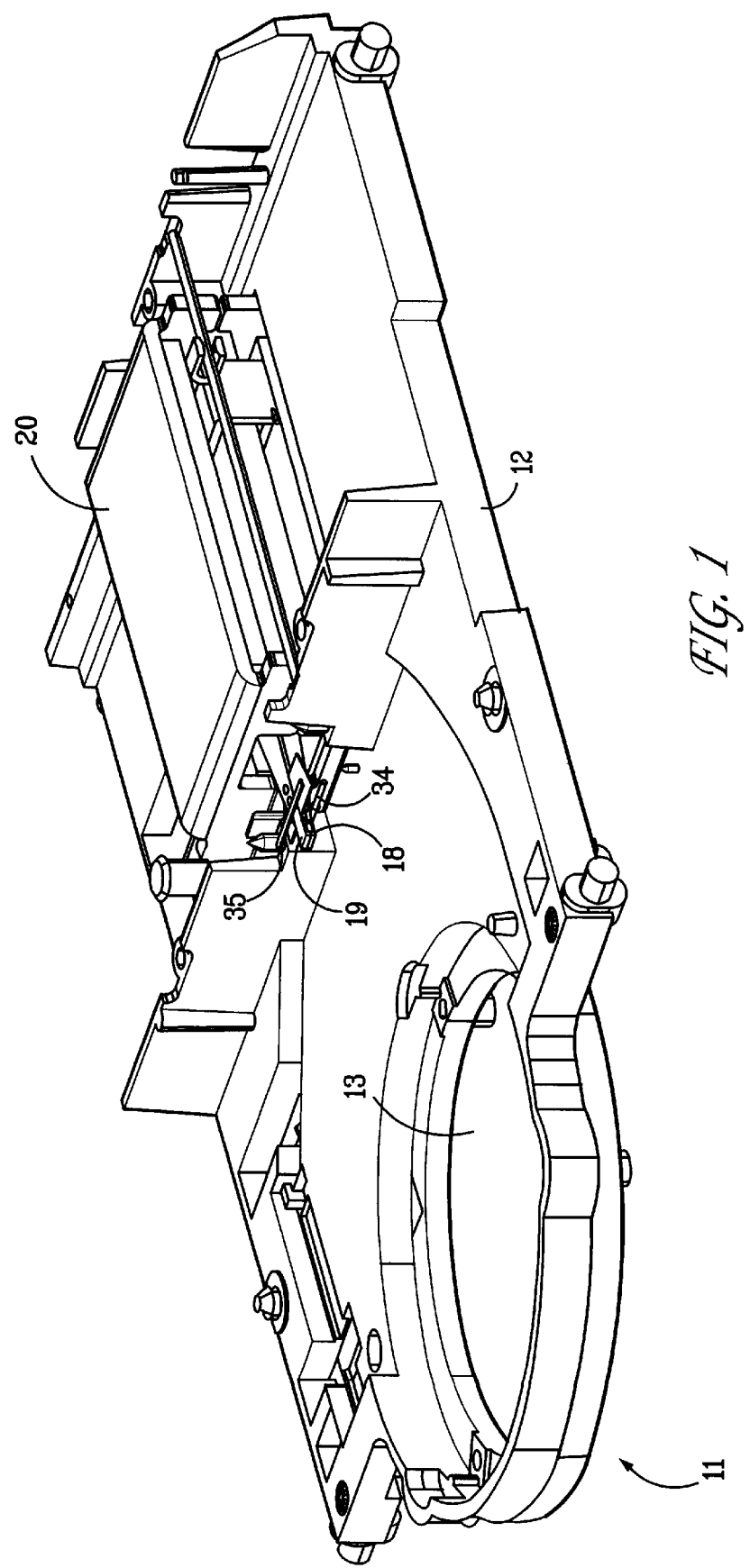
FIG. 1 shows the disk drive of the present invention with the cover removed.

FIG. 1 shows a disk drive 10 of the type in which a cartridge containing a recording media (not shown) is inserted into the drive at 11. A motor is mounted on platform 12 at 13. The motor rotates the flexible disk in the cartridge.

The disk is engaged by opposed read/write heads 18 and 19 which are carried by the actuator. Opposed heads engage both sides of the disk.

The voice coil motor for driving the carriage into and out of engagement of the heads with the recording medium includes an outer return path member 20 and magnets. A coil (not shown) is mounted on the carriage assembly. When the coil is energized, it interacts with the magnets to move the carriage linearly so that the heads 18 and 19 engage concentric tracks on the disk. The carriage includes two lightweight arms which bias the heads toward one another. The carriage travels on a central guide track 28.

The foregoing is described more fully in U.S. Pat. 5,768,059 which is incorporated herein by reference.

Figure 2:
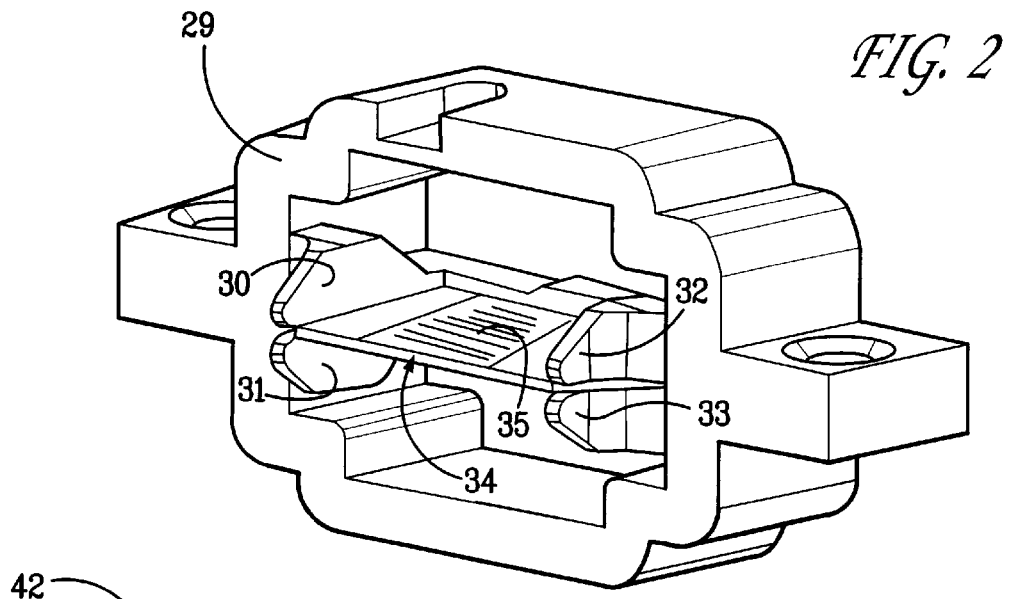
FIG. 2 shows the load ramp assembly and head cleaner.

FIG. 2 shows the improved load ramp of the present invention. It is a single part 29 preferably made from injection molded plastic. The load/unload device shown in FIG. 2 is a drop-in replacement for the head load/unload device 40 shown in the foregoing U.S. Pat. 5,768,059. It includes four ramp profiles 30–33 on the part. The ramp profiles are opposed so that the heads move apart as they move out of engagement with the recording medium. Then the heads move together as they move further out of engagement with the recording medium.

Wings 34 and 35 (FIG. 1) ride up on the opposed ramp profiles 30–33 as the carriage assembly moves the heads out of engagement with the recording medium. This spreads and holds the heads apart. Then the heads are brought together onto the head cleaner 34 of the present invention. The head cleaner is made of rigid material such as aluminum, ceramic, or molded plastic. The surface 35 of the head cleaner, where the head makes contact is textured such that the texture line is not parallel to the direction of the slider motion FIG. 4 and preferably they form a crosshatched pattern. Alternatively, the texture lines are mostly orthogonal to the direction of slider motion. The textured surface will contact the slider ABS surface during the load/unload process. Light abrasion occurs between the head cleaner and the slider ABS. Because the texture line are not parallel to the direction of the slider motion, contaminants are removed from the slider surface. Therefore the degradation of the magnetic performance of the recording heads is prevented. Texturing of an aluminum or plastic head cleaner can be achieved with a polishing pad. Optionally, a diamond compound may be used with the polishing pad to achieve the proper texture on the cleaning pad. A plastic head cleaner can be molded with surface texture.

Figure 3:
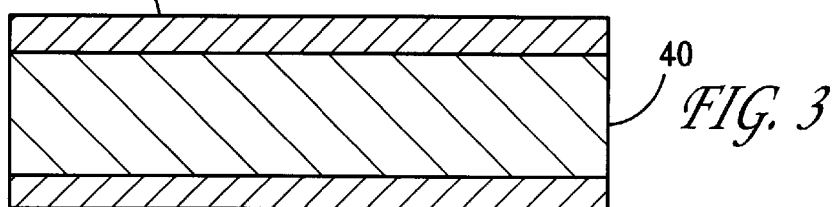
FIG. 3 shows an alternative head cleaner structure.

In an alternative embodiment of the invention, shown in FIG. 3, the rigid head cleaner 40 is coated with a thin layer 42. 44 of protective coating such as a wear resistant DLC (diamond like carbon) coating. The selection of the coating depends on the material used for the head cleaner. DLC coating will be a good choice if aluminum or plastic is used as the head cleaner while a thin layer of lubricant is advantageous if a ceramic head cleaner is used. Lubricant can also be added on top of the DCL coating. The lubricant is of the type commonly applied to the surface of hard magnetic recording disks, such as Z-DOL.

Figure 4:
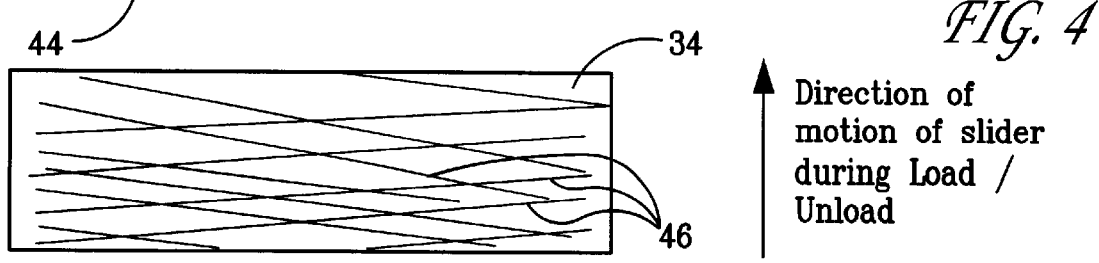
FIG. 4 shows the direction of motion of the slider with respect to texture lines on the head cleaner.

FIG. 4 shows an embodiment in which the entire cleaning pad 34 has been textured with the texture lines 46 extending primarily perpendicular to the direction of motion of the slider which carries the heads.

Figure 5:
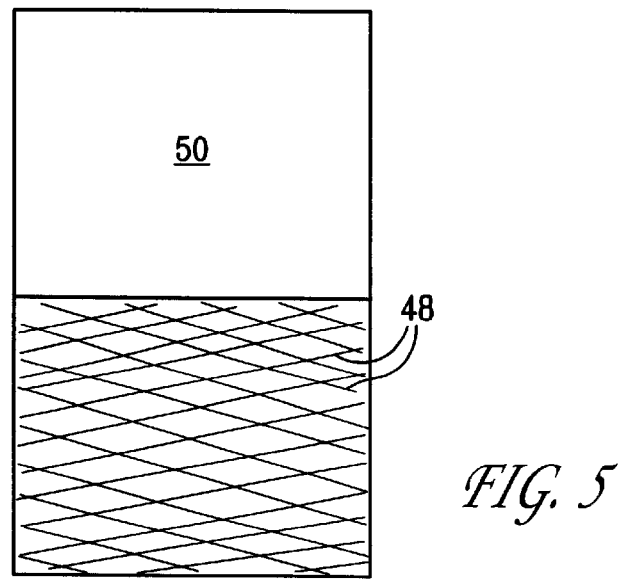
FIG. 5 shows an alternative embodiment with a rigid head cleaner next to a more compliant cleaner.

FIG. 5 shows yet another alternative embodiment of the invention. A rigid, textured head cleaner 48 is placed next to a more compliant soft head cleaning element 50. The texture of head cleaner 48 is crosshatched. The soft head cleaning element 50 will clean the debris in the recessed area of the slider ABS, while the rigid head cleaner removes the debris from the top surface of the slider ABS. The soft cleaning element has fibers which stand up like a soft brush.

While a particular embodiment of the invention has been shown and described various modifications may be made without departing from the true spirit and scope of the invention.

What is claimed is:

1. A disk drive comprising:

an actuator;

read-write heads, said actuator moving said read-write heads into and out of engagement with a recording medium;

a rigid head cleaner including a load/unload ramp, said load/unload ramp having an angled side which moves said heads onto said rigid head cleaner as said heads are moved out of engagement with said recording medium, wherein said load/unload ramp moves said heads together to engage said recording medium as said actuator moves toward said recording medium and to move said heads apart as said actuator moves said heads away from said recording mediums; and a soft head cleaning element, said rigid head cleaner being next to said soft head cleaning element, said load/unload ramp moving said heads together across said rigid head cleaner and the soft head cleaning element as said heads are moved out of engagement with said recording medium.

2. A disk drive comprising:

an actuator;

read-write heads, said actuator moving said read-write leads into and out of engagement with a recording medium;

a load/unload ramp having an angled side which moves for moving said heads together to engage said recording medium as said actuator moves toward said recording medium and to move said heads apart as said actuator moves said heads away from said recording medium;

a rigid head cleaner, said load/unload ramp moving said heads onto said rigid head cleaner as said heads are moved out of engagement with said recording medium; and a soft head cleaning element; said rigid head cleaner being next to said soft head cleaning element, said load/unload ramp moving said heads together across said rigid head cleaner and said soft head cleaning element as said heads are moved out of engagement with said recording medium.

* * * * *